Jan. 4, 1966    P. A. MORGAN    3,227,868
LIGHT UNIT AND ADAPTER BASE
Filed May 28, 1962
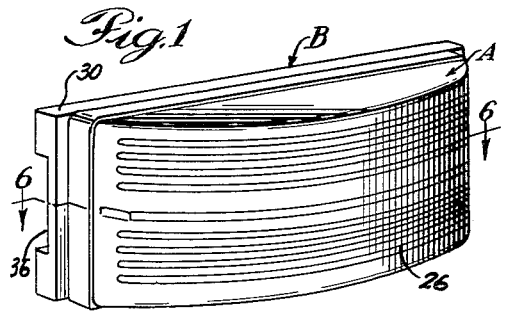
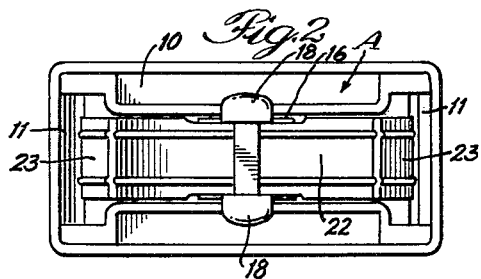
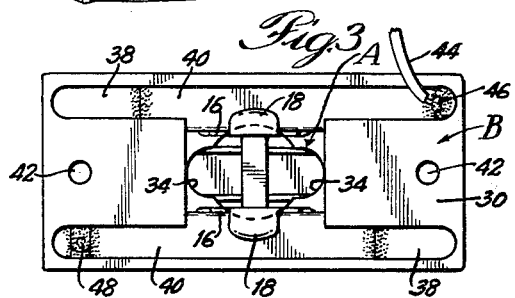
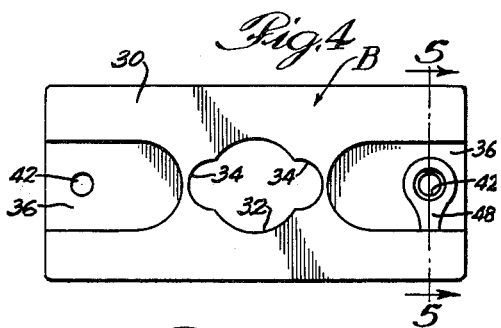
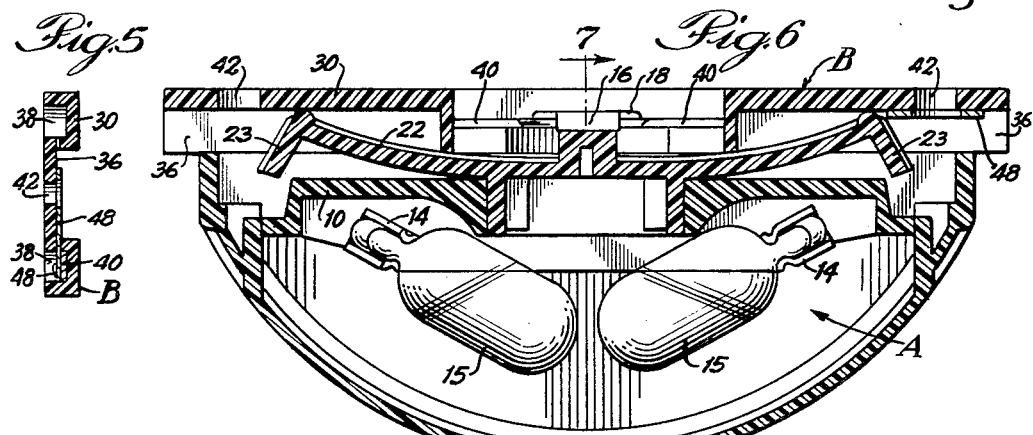
INVENTOR:
Paul A. Morgan,
BY Bair, Freeman & Molinare
ATTORNEYS.

3,227,868
Patented Jan. 4, 1966

---

3,227,868
LIGHT UNIT AND ADAPTER BASE
Paul A. Morgan, Chicago, Ill., assignor to King Bee Manufacturing Co., Bellwood, Ill., a corporation of Illinois
Filed May 28, 1962, Ser. No. 198,063
1 Claim. (Cl. 240—8.2)

This invention relates to the combination of a light unit and an adapter base capable of numerous and varied uses, and which combination is particularly suitable for use in vehicle lighting systems in the nature of identification and clearance lights for road vehicles, such as trucks, buses, trailers, and semi-trailers.

Highway vehicles, such as trucks, buses, trailers and semi-trailers, must be provided with lighting systems which comply with the rigid lighting requirements established by the Interstate Commerce Commission. The established regulations for lighting of such vehicles are definite and rigid and must be strictly observed by the vehicle operators. Among the requirements for lighting of such vehicles are specific designations as to size and location, as well as numbers, of both identification and clearance lights. Such lights as generally used for this purpose are of the type including an electric lamp bulb mounted in a socket attached to a base or mounting, with a housing including a lens for enclosing the lamp bulb. Normally, when such lamp bulbs burn out or when the light unit has become damaged while the vehicle is in transit, it is usually difficult and inconvenient to replace the bulbs or units. This situation exists because lamp bulbs for specific types of lamps, as well as complete light units, are not always obtainable along with the services of a mechanic at most service stations along the highways. It is, therefore, highly desirable that light units used for identification and clearance lights be of such form and character as will permit an operator to quickly and easily replace a total light unit without the necessity for calling upon special mechanics, and which would, of course, delay movement of the vehicle.

One of the objects of this invention is to provide a novel combination of a light unit and adapter base which may be quickly and easily mounted in operative relation, and wherein the light unit may be conveniently mounted in operative relation to the adapter base without requiring the use of any tools.

Another object is to provide a novel combination of a light unit and adapter base wherein the light unit is caused to be securely latched to the adapter base in a manner to preclude its removal intact, and which necessitates destruction of parts of the light unit in order to permit complete removal of the unit with respect to the adapter base.

A further object is to provide a novel combination light unit and adapter base of the character indicated which permits substantial latitude in selection of the area for mounting of the assembly on a mounting surface.

It is also an object of the present invention to provide a novel combination of a light unit and adapter base which are provided with cooperating features by virtue of which the light unit is secured in latched relation to the adapter base in a manner to preclude removal intact of the light unit with respect to the adapter base, and which assembly is capable of installation on vehicle bodies without the necessity for changing or replacing existing wiring for such light circuits.

A further object is to provide a novel combination of a light unit and adapter base which may be quickly and simply installed, and wherein the light unit may be quickly and easily attached to the adapter base by initially placing the unit at approximately right angles to the adapter base, and then rotating the unit approximately 90 degrees, at which time the unit becomes operatively attached to the base and the lighting circuit, and is securely latched to the base so as to preclude its removal, except by breakage.

Still another object is to provide a novel combination light unit and adapter base which is extremely simple in construction, durable in use, composed of relatively few parts, and which is inexpensive to manufacture, by virtue of which it is economically practical to completely discard and totally replace a light unit when any parts thereof become worn or damaged.

Other objects and advantages of this invention will be apparent from the following description, taken in connection with the accompanying drawing, in which:

FIGURE 1 is a perspective view of the novel combination of a light unit and adapter base;

FIGURE 2 is a plan view of the underside of the light unit;

FIGURE 3 is a plan view of the underside of the assembly of the lamp unit and adapter base;

FIGURE 4 is a top plan view of the adapter base disassembled from the light unit;

FIGURE 5 is a transverse, sectional view through the adapter base taken as indicated at line 5—5 on FIGURE 4;

FIGURE 6 is an enlarged, longitudinal sectional view through the assembly of the light unit and adapter base taken substantially as indicated at line 6—6 on FIGURE 1;

FIGURE 7 is an enlarged, transverse view, part in elevation and part in section, and taken substantially as indicated at line 7—7 on FIGURE 6.

The assembly embodying the present invention comprises a light unit, indicated generally at A, and an adapter base indicated at B. The light unit A may be understood to be substantially identical to the light unit disclosed in my copending application, Ser. No. 131,375, filed Aug. 14, 1961, and the construction thereof will, therefore, be herein described in somewhat general terminology. The light unit comprises a flat, rectangular mounting base 10, formed of molded electrical insulating material which is of elongated form, the opposite ends of which are notched or recessed as indicated at 11. Mounted transversely of the base are a pair of identical contact members or conductor elements 12, the ends of which are cooperatively formed and extend above the base to provide sockets, as indicated at 14, for accommodating lamp bulbs 15 therein. The contact members are formed as sheet metal stampings and each include a centrally located leg 16 extending through the mounting base, with their outer ends being bent laterally outwardly to form contact lugs 18.

Secured to and positioned below the underside of the mounting base 10 is an elongate leaf spring latch type member 22, which is of generally arcuate contour, as clearly seen in FIGURE 6 of the drawing. Preferably, the latch member is formed of suitable insulating material, such as plastic, and the ends of the latch member terminate in upwardly extending flanges 23, which are adapted to move into the notched portions 11 of the base when the light unit is in process of being mounted in operative position on the adapter base B.

When the contact members and lamp bulbs, together with the spring latch member 22 are operatively connected to the mounting base 10, the lamps bulbs may then be enclosed by a housing 26, which also functions as a lens. The housing is formed of suitable translucent plastic material and is generally, in outline form, a segment of a disc. The housing is dimensioned for a telescopic fit with respect to the mounting base 10 and may be, in addition, attached permanently thereto by the use of suitable adhesive.

The adapter base comprises a relatively flat body 30 of suitable insulating material, and is of generally oblong form just slightly longer in length than the mounting base 10 of the light unit, as may be seen in the drawing. The base is formed substantially centrally of its length with an elongated opening 32 in which the entire peripheral surface of the opening preferably is formed by a series of interconnecting arcuate contours, with the end portions 34 of said opening being substantially of semi-circular formation, and the dimension lengthwise of said opening being just sufficient for accommodating the terminal lugs 18 of the contact members therethrough preparatory to mounting the light unit in operative position in the lamp base. The upper surface of the adapter base is formed at opposite ends with recesses 36, into which the outer end portions of the spring latch 22 are adapted to extend and seat in, as clearly seen in FIGURE 6, and by virtue of which the light unit and adapter base are securely connected together after the lamp unit has been positioned in proper operative relation to the adapter base.

The underside of the adapter base 30 is formed with a pair of longitudinally extending recesses 38, in each of which is fixedly secured, such as by suitable adhesive, elongated terminal strips 40, which are positioned upwardly with respect to the bottom surface of the adapter base, as seen in the drawing. The adapter base is provided at opposite ends with a pair of apertures 42 for attachment to a mounting surface by any suitable fastening means. In order to provide for a connection of the adapter base into an electrical circuit, one of the conductor strips has a short length of conductor wire 44, soldered or mechanically connected to one end of a terminal strip 40, as indicated at 46. The opposite end of the other conductor strip 40 is soldered or mechanically connected to an eyelet type terminal 48, the leg of which extends through an opening in the inner wall and continues into the recess 38 in direct contact with the terminal strip, as seen in FIGURE 5. The apertured portion of the eyelet terminal registers with the adjacent opening 42, so that fastening means extending through the terminal and the corresponding end of the adapter base may be made with the ground connection of the electrical circuit of the vehicle body.

The light unit A may be quickly and easily mounted in operative relation to the adapter base B by first placing the light unit transversely of the adapter base so that the terminal lugs 18 of the contact members extend freely through the arcuate end portions 34 of the opening in the adapter base. The light unit is then rotated approximately 90 degrees to the position seen in FIGURES 1, 3, 6 and 7 of the drawing, at which time the terminal lugs 18 are brought into sliding frictional contact with the terminal strips 40 on the adapter base for completing the electrical circuit with respect to the lamp bulbs 15. Preparatory to turning the light unit to its operative position, pressure is exerted on the unit to compress the outer ends of the spring latch 22, and while turning said unit the outer ends of the latch member register and move down into the recesses 36 of the adapter base, and thereby securely latching the light unit to the adapter base—and thereafter precluding turning of the light unit relative to the adapter base. When the light unit is properly mounted on the adapter base, it is practically impossible to remove the light unit, even by means of tools, without damaging or destroying the light unit. It is therefore apparent that the light unit, when so mounted in operative position on the adapter base, cannot be removed intact from the adapter base. To effect a removal of the light unit because of a burned out lamp bulb or damage to any part of the light unit, said unit must at least be partially destroyed by first rupturing the housing 26 in order to gain access to the free ends of the spring latch 22, and thereby permit compressing of the ends of the spring latch in order to permit turning of the remainder of the light unit transversely of the adapter base to effect separation or removal therefrom.

The novel combination of the light unit and adapter base permits of great latitude in mounting of a total assembly in a desired location on a mounting surface, and permits use as either initial equipment to be installed, such as on a vehicle body, or permits its use as a total replacement for existing identification or clearance lamps on vehicles, without the necessity of changing or altering existing wiring of an electrical circuit.

Although I have herein shown and described a preferred embodiment of my invention, manifestly it is capable of modification and rearrangement without departing from the spirit and scope thereof. I do not, therefore, wish to be understood as limiting this invention to the precise embodiment herein disclosed, except as I may be so limited by the appended claim.

I claim:

A light assembly comprising an adapter base of insulating material for securement to a mounting surface, a light unit for mounting on the adapter base in fixed, interlocking relation, said light unit comprising a mounting base of insulating material, a pair of spaced apart contact members carried on the mounting base, a socket connected to said members, a lamp bulb mounted in the socket, said contact members each having a leg extended through to the underside of the mounting base, said adapter base having an opening for the reception therein of said pair of contact members when the light unit is placed on the adapter base in angular offset relation to a final position of adjustment of the light unit, a pair of spaced apart terminal strips on the adapter base, for connection in an electrical circuit, said strips being engaged by the respective contact members when the light unit is rotated to a final position relative to said adapter base, the outer surface of said adapter base being formed with an elongated recess, and a spring latch member carried on and having a portion extending below the mounting base of the light unit for seating in said recess to fixedly lock the light unit to the adapter base when said unit has been rotated to said final position relative to said adapter base.

References Cited by the Examiner

UNITED STATES PATENTS

| | | | |
|---|---|---|---|
| 776,855 | 12/1904 | Le Har | 339—176 X |
| 1,460,246 | 6/1923 | Hubbell | 339—80 |
| 2,275,533 | 3/1942 | Landy | 240—10 X |
| 2,361,537 | 10/1944 | Frank | 339—21 |
| 2,884,609 | 4/1959 | Fraser et al. | 339—126 X |
| 2,922,875 | 1/1960 | Buck | 240—8.2 |
| 2,925,645 | 2/1960 | Bell et al. | |
| 2,965,750 | 12/1960 | Baldwin | 240—8.2 |
| 2,977,566 | 3/1961 | Neumann et al. | 339—119 |
| 3,089,951 | 5/1963 | Baldwin | 240—7.1 |

NORTON ANSHER, *Primary Examiner.*